United States Patent Office 3,488,978
Patented Jan. 13, 1970

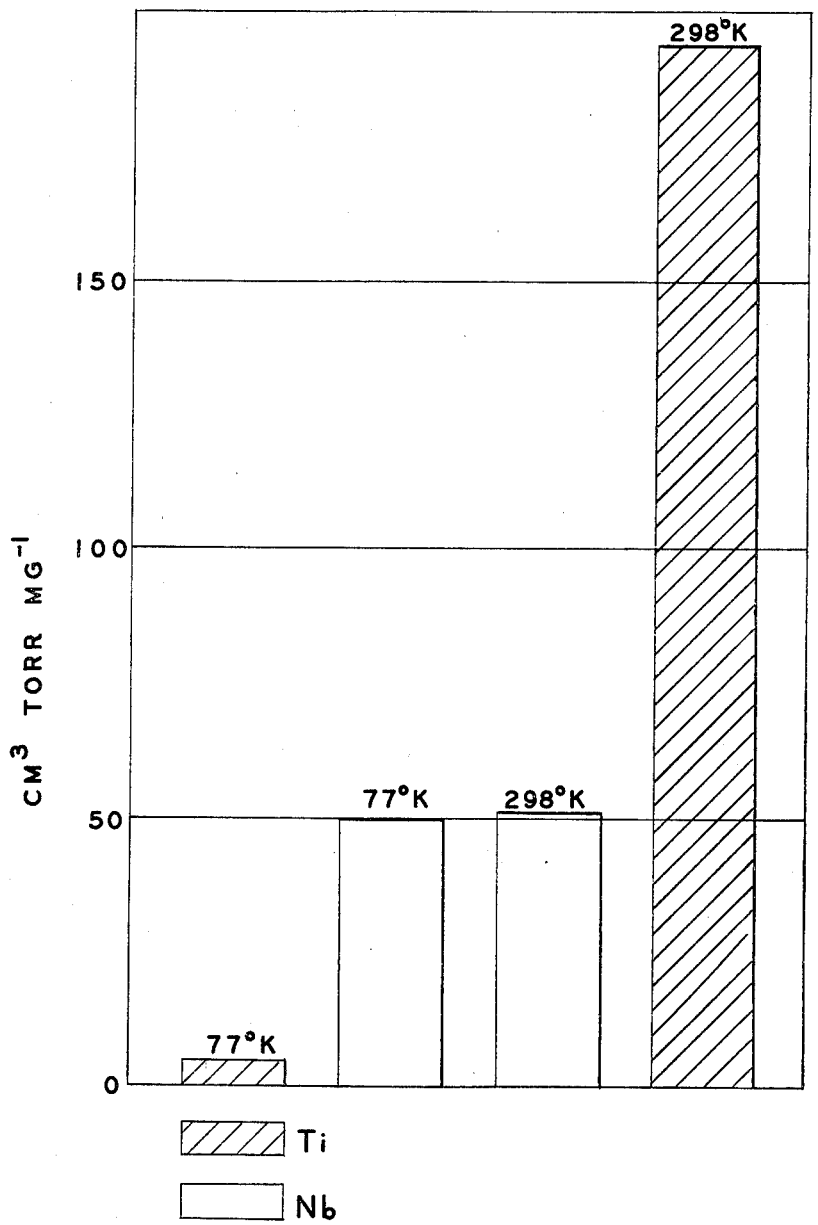

3,488,978
CRYOPUMPING, PARTICULARLY
FOR HYDROGEN
Paolo della Porta and Tiziano A. Giorgi, Milan, Italy, assignors to S.A.E.S. Getters S.p.A., Milan, Italy, an Italian company
Filed Sept. 28, 1966, Ser. No. 582,604
Claims priority, application Italy, Sept. 29, 1965, 729,609
Int. Cl. B01d 5/00
U.S. Cl. 62—55.5          9 Claims

ABSTRACT OF THE DISCLOSURE

Cryopumping to create high vacuum by condensing hydrogen-containing gases on surfaces of Ta, V, or Nb.

---

Cryopumping is becoming more and more important in the field of the modern technology of vacuum, and particularly when it is applied to space simulators, where very high characteristics of both velocity and capacity are requested.

The technique of cryopumping consists essentially of providing surfaces having a very great geometrical extension which are introduced in the system of vacuum, which surfaces can be cooled to very low temperatures and are therefore capable of condensing thereon all gases or vapours that are present in the system. To that end temperatures of the order of 20° K. are sufficient for the major part of gases, since at these temperatures the vapour pressures of the condensate are quite lower than $10^{-11}$ torr. Said temperatures are, however, insufficient for the gases such as helium, neon, and hydrogen. Indeed, in the case of hydrogen, which this invention particularly concerns, the vapour pressure is of the order of $10^{-9}$ torr even at a temperature of 3–4° K.

To improve this situation, experiments are being made to find materials which have very extended surfaces and are adapted for these gases. It is, however, to be pointed out that the increased surface is in no way adapted or capable of influencing the equilibrium pressure of said gases, other than with the formation of solid solutions or stoichiometric compounds. Such materials are artificial zeolites, natural coal, and the like substances which have no action other than that of physical absorption.

Other experiments are being made with the use of films of evaporated metals. Said films are generally or exclusively made of titanium, which by forming a solid solution with the hydrogen absorbs considerable quantities of hydrogen and shows considerable reductions of equilibrium pressures until the solid concentration is not too high. This action may certainly not take place for the other gases, but if, for instance, the titanium is sublimed continuously, an action of burying of said gases within the structure of the titanium will take place.

The data known from the technical literature and the practical results found by us have shown that as the temperature of a film of titanium is decreasing, also its absorbing characteristics are diminishing. This dimunition which is not apparently explicable from the known behaviours of solid solutions, may be explained by the consideration that at such low temperatures the gaseous molecules will have a reduced dissociation power upon said surfaces, and, perhaps, also may be explained by a reduced diffusion possibility of the atoms of the gases in the metal.

In the course of our experiments on the metals of the fifth group, that are niobium, vanadium, and tantalum, it has surprisingly been found that the data obtained with titanium, and which are presumably valid for all metals of the fourth group, have not been respected. Indeed, the absorbing characteristics of the films made with metals of fifth group have been found to be invariable with the decreasing of the temperature within the range of 20° K.–300° K. This characteristic brings us to consider the use of said metals as very efficient agents for cryopumping, much more than the metals used up to date for this purpose. The surprising new effect is probably explained by a high power either of dissociation and of diffusion, of said metals.

These considerations are to be applied particularly to hydrogen cryopumps. The usual and known techniques for other gases may be employed. A cryopump may be composed of a section made according to known techniques for normally condensable gases and by another section made according to this invention and acting mainly for hydrogen.

The improved cryopumping with the use of one of the metals of the fifth group, that are Ta, V, and Nb, according to this invention, is actuated with the known techniques and only by way of example the data obtained with a film having a geometrical extension of 70 cm.$^2$ are shown by the annexed drawings.

By exposing an evaporated film of niobium to hydrogen either at a temperature of 298° K. and of 77° K., the absorbing capacities are of the order 45 cm.$^3$ torr/mg. at both temperatures and are characterized by the fact that the measured velocity (at pressures of the order of $10^{-8}$ torr), at the lowest temperature, remains practically constant at the above said quantity.

By exposing an evaporated film of titanium, the absorbed quantity at 298° K. is 200 cm.$^3$ torr/mg., and is 5 cm.$^3$ torr/mg. at 77° K., whereby the absorbing velocity is low and decreasing.

What we claim is:
1. In a cryopump for creating high vacuum by sorbing hydrogen on cryopumping surfaces, the improvement wherein the surfaces comprise a film of one or more metals selected from the group consisting of Ta, V, and Nb.
2. Improvements according to claim 1, characterized by the fact that the film is of niobium.
3. In a process of cryogenically pumping hydrogen to obtain high vacuum, the improvement comprising contacting the hydrogen with a film of a metal selected from the group consisting of Ta, V, and Nb.
4. The process of claim 3 wherein the metal is at cryogenic temperatures.
5. The process of claim 3 wherein the metal is niobium.
6. In a process of cryogenically pumping hydrogen to obtain a high vacuum, the improvement comprising contacting the hydrogen with a film of niobium.
7. In a process of cryogenically pumping hydrogen to obtain high vacuum, the improvement comprising contacting the hydrogen with a film of a metal selected from the group consisting of Ta, V, and Nb.
8. In a process of cryogenically pumping hydrogen to obtain high vacuum, the improvement comprising contacting the hydrogen with a film of a metal selected from the group consisting of Ta, V, and Nb wherein said film is at a temperature of about 77° K.
9. In a process of cryogenically pumping hydrogen to obtain high vacuum, the improvement comprising contacting the hydrogen with a film consisting essentially of a metal selected from the group consisting of Ta, V, and Nb.

(References on following page)

References Cited

UNITED STATES PATENTS

| | | | |
|---|---|---|---|
| 3,252,291 | 5/1966 | Eder | 62—55.5 |
| 3,262,279 | 7/1966 | Moore | 62—55.5 XR |
| 3,263,434 | 8/1966 | Eder | 62—55.5 |
| 3,286,531 | 11/1966 | Shapiro et al. | 62—55.5 XR |
| 3,300,992 | 1/1967 | Hager et al. | 62—55.5 XR |
| 3,309,844 | 3/1967 | Hemstreet et al. | 55—269 |

OTHER REFERENCES

Scott: Cryogenic Engineering, New York, Van Nostrand, 1959 (p. 342 relied upon).

McClintock: Cryogenics, New York, Reinhold, 1964 (pp. 201 and 202 relied upon).

LLOYD L. KING, Primary Examiner

U.S. Cl. X.R.

55—269